United States Patent [19]
Ueyama

[11] Patent Number: 5,264,963
[45] Date of Patent: Nov. 23, 1993

[54] VARIFOCAL LENS ASSEMBLY

[75] Inventor: Masayuki Ueyama, Takarazuka, Japan

[73] Assignee: Minolta Camera Kabushiki Kaisha, Osaka, Japan

[21] Appl. No.: 887,332

[22] Filed: May 22, 1992

[30] Foreign Application Priority Data

May 23, 1991 [JP] Japan .................. 3-118458

[51] Int. Cl.⁵ ......................... G02B 15/14
[52] U.S. Cl. ................... 359/695; 359/699
[58] Field of Search ........... 359/694, 695, 696, 697, 359/699, 700; 354/400, 402, 475, 195.13; 358/225

[56] References Cited

U.S. PATENT DOCUMENTS

| | | | |
|---|---|---|---|
| 3,850,507 | 11/1974 | Uesugi | 359/695 |
| 4,281,907 | 8/1981 | Kamata | 359/700 |
| 4,861,147 | 8/1989 | Tanaka | 359/700 |

FOREIGN PATENT DOCUMENTS

| | | |
|---|---|---|
| 57-144506 | 9/1982 | Japan . |
| 62-284317 | 12/1987 | Japan . |
| 63-49715 | 3/1988 | Japan . |
| 63-261210 | 10/1988 | Japan . |
| 119121 | 4/1992 | Japan . |

Primary Examiner—Loha Ben
Attorney, Agent, or Firm—Price, Gess & Ubell

[57] ABSTRACT

A lens assembly has zooming and focusing capabilities and a plurality of lens groups. The lens assembly has a region ranging from an infinity position to a closest available position and over which some of the lens groups used for focusing purpose are driven in an axial direction parallel to an optical axis of the lens assembly in a distance variable with a change in focal length resulting from a zooming operation. This lens assembly includes a zooming mechanism for driving some of the lens groups used for zooming purpose to respective predetermined positions appropriate to a preselected focal length, a focusing mechanism for driving the lens groups used for focusing purpose independently of the zooming mechanism over a stroke which is constant regardless of the position of focal length selected by the zooming mechanism, and a cam mechanism provided in the zooming mechanism for avoiding any possible interference of any one of the lens groups used for focusing purpose with any one of the remaining lens groups and/or any other stationary member when lens groups used for the focusing purpose are driven over the region.

21 Claims, 11 Drawing Sheets

VARIFOCAL LENS ASSEMBLY

BACKGROUND OF THE INVENTION

1. Field of the Invention

The present invention generally relates to a photographic zoom lens assembly and, more particularly, to the photographic zoom lens assembly of varifocal type.

2. Description of the Prior Art

A majority of photographic zoom lens assemblies now in use are of a standard design wherein the zooming operation does not affect the position of focus. In this design, the stroke of movement of the focusing lens group between the closest available position and the infinity position falls within the entire zooming range in which the zooming lens group can move to accomplish a change in focal length of the lens assembly as a whole. This means that the stroke of movement of the focusing lens group between those extreme positions remains constant regardless of a change in focal length that would result from the zooming operation. Therefore, a photographer need not go through a focusing operation each time the focal length is changed.

However, this standard design requires a highly sophisticated optical design that hampers a reduction in size and cost of the zoom lens assembly.

As an alternative to the standard zoom lens assembly discussed above, the varifocal lens assembly is well known in the art. For a given available zooming ratio, the varifocal lens assembly is generally considered having merit which is demerit of the standard zoom lens assembly. In other words, as compared with the standard zoom lens assembly having the same available zooming ratio, the varifocal lens assembly can be assembled light-weight and compact in size.

However, in the varifocal design, the amount of movement of the focusing lens group from the infinity position towards a certain lens position generally intermediate between the closest available position and the infinity position tends to increase as the zooming lens group is moved from a wide position, corresponding to the smallest available focal length, towards a tele position corresponding to the largest available focal length. Accordingly, if the stroke of movement of the focusing lens group is fixed to a value generally employed in the standard design, the minimum camera-to-object distance available to the varifocal lens assembly when the focusing lens group is set at the closest available position becomes larger as the focal length is increased. Conversely, if design is made that the minimum camera-to-object distance available to the varifocal lens assembly when the focusing lens group is set at the closest available position is relatively small even when the zooming lens group is set at a position of largest available focal length, the resultant varifocal lens assembly would be such that, when the zooming lens zooming lens group is set at a position of smallest focal length, the focusing lens group would extend a distance with which the optical performance can no longer be guaranteed, or which may result in an abutment with other lens groups and/or a stationary component part. Accordingly, in the varifocal lens assembly, it is a general practice to vary the stroke of movement of the focusing lens group with a change in focal length.

In an attempt to obviate the inconveniences inherent in the varifocal lens assembly, the Japanese Laid-open Patent Publication No. 63-261210, published Oct. 27, 1988, discloses a varifocal lens drive device which comprises a detecting means for detecting the position of a focusing lens group on the optical axis, a drive means for driving the zooming lens group, a calculating means for calculating the amount of extension of the focusing lens group from the infinity position towards the closest available position when the lens assembly is set at any focal length position, and a comparing means for comparing respective outputs from the detecting means and the calculating means with each other so that a detected end signal can eventually be provided for controlling the drive means.

Also, the Japanese Laid-open Patent Publication No. 62-284317, published Dec. 10, 1967, discloses a photographic zoom lens assembly including a zooming sensor installed within a lens barrel, and an external control circuit operable to refer to data representative of the range in which the focusing is possible, which range is variable according to the output from the zooming sensor and the selected focal length, thereby to control the focusing lens group not to depart from the focusing range.

The Japanese Patent Publication No. 1-19121, published Apr. 10, 1969, discloses a focusing system in a zoom lens assembly wherein the provision has been made of a regulating member for detecting a departure of the focusing lens group from the focusing range in dependence on the selected focal length and for subsequently driving the focusing lens group into the focusing range.

In any one of the prior art systems discussed above, an electric circuit system is employed for varying the stroke of movement of the focusing lens group and, in the event of an abnormality occurring in a control member such as, for example, an erroneous detection of the position of the lens groups, there is a possibility that the lens groups may collide with each other. Also, the use of an extra detecting member for the detection of the position of the lens groups is necessitated. On the other hand, where the lens assembly is of a type requiring an electric power supply from a camera body to which the lens assembly is mounted, the removal of the lens assembly from the camera body disables the electric circuit system built in the lens assembly and, therefor, the lens assembly still has the above discussed problems when the zooming operation is performed unnecessarily.

SUMMARY OF THE INVENTION

The present invention has been devised with a view to substantially eliminating the above discussed problems and inconveniences inherent in the prior art varifocal lens assemblies and is intended to provide an improved varifocal lens assembly wherein simple and inexpensive means is provided to eliminate the problems and inconveniences associated with the zooming operation.

In order to accomplish the foregoing object, the present invention provides a varifocal lens assembly which has zooming and focusing capabilities and a plurality of lens groups, the lens assembly being of a type wherein a region ranging from an infinity position to a closest available position and over which some of the lens groups used for focusing purpose are driven in an axial direction parallel to an optical axis of the lens assembly is variable with a change in focal length resulting from a zooming operation. This lens assembly includes a zooming mechanism for driving some of the lens groups used for zooming purposes to respective predetermined positions appropriate to a preselected focal length, a focusing mechanism for driving some of the lens groups used for a focusing purpose independently of the zooming mechanism over a stroke which is constant regardless of the position of focal length selected by the zooming mechanism, and a cam mechanism provided in the zooming mechanism for avoiding any possible interference of any one of the lens groups used for a focusing purpose with any one of the remaining lens groups and/or any other stationary member when the lens groups used for focusing purpose are driven over the region.

The cam mechanism referred to above includes a generally helicoidally extending cam groove of a lead width sufficient to avoid the interference of the focusing lens groups with any other lens group and/or the stationary member forming a part of the varifocal lens assembly.

According to the present invention, any possible displacement in position of focus which would occur as a result of the zooming operation can be compensated for by an electric control scheme, enabling the varifocal lens assembly to be used as a standard zoom lens assembly of a type wherein no displacement in position of focus occurs.

BRIEF DESCRIPTION OF THE DRAWINGS

This and other objects and features of the present invention will become readily understood from the following description of a preferred embodiment taken with reference to the accompanying drawings, in which like parts are designated by like reference numerals and in which.

DETAILED DESCRIPTION OF THE EMBODIMENT

A varifocal lens assembly embodying the present invention and shown in the accompanying drawings comprises an optical system including five groups or units of lenses L1, L2, L3, L4 and L5. While all of the lens groups L1 to L5 are cooperative with each other to work as a zooming lens group, the lens groups L3 to L5 are cooperative with each other to work as a focusing lens group. It is to be noted that, so far as shown in FIGS. 1 to 4, the zooming lens group is set at a wide position, i.e., a position of minimum available focal length, whereas the focusing lens group is set at an infinity position, i.e., is held in a position to focus on a target object at an infinity distance.

Also, it is to be noted that the illustrated varifocal lens assembly is of a type for use with a photographic camera body having a drive motor built therein and having a coupler operable to transmit the drive of the drive motor to a focusing lens drive mechanism when the varifocal lens assembly is mounted on the camera body. The illustrated varifocal lens assembly has a powered zooming capability, i.e., a capability of the zooming lens groups to be driven by a zooming drive motor built in the lens assembly when a zooming ring or button is operated.

Referring first to FIGS. 1 to 4, the varifocal lens assembly comprises a fixed barrel 5 fixed at a rear end of a mount 51 by means of a plurality of set screws, only one of which is shown by 52. The mount 51 referred to above may be one of a pair of rings engageable together in, for example, a bayonet engagement, the other of the paired rings being secured to the camera body in a manner well known to those skilled in the art. This fixed barrel 5 is coaxially housed within an outer barrel 2 secured at a rear end to the mount 51 by means of a plurality of set screws (not shown). The mount 51 has a light shielding member 51b secured thereto, or otherwise formed integrally therewith, so as to extend a distance axially inwardly of the fixed barrel 5.

Figure 4:
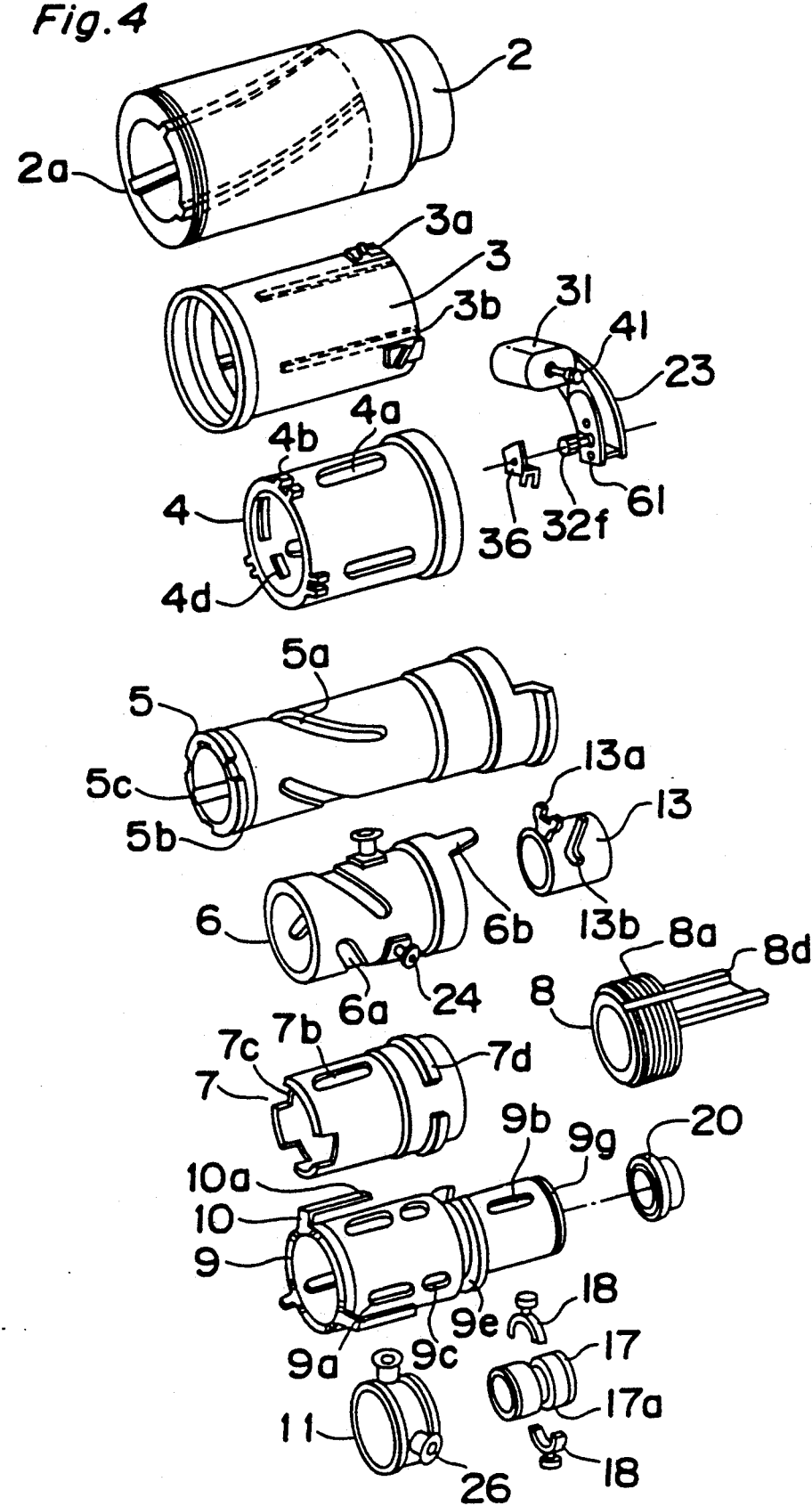
FIG. 4 is an exploded view of the varifocal lens assembly embodying the present invention.

The outer barrel 2 has a generally tubular operating ring 1 mounted thereon and held in position around the outer barrel 2 by means of a fixture ring 53 mounted on a front end of the outer barrel 2 remote from the mount 51. The fixture ring 53 serves to prevent the operating ring 1 from being separated from the outer barrel 2. The outer barrel 2 has an inner peripheral surface formed with helicoidal grooves 2a as best shown in FIG. 4. This outer barrel 2 also has a clutch fitting member 54 mounted thereon at a position adjacent the rear end thereof, the clutch fitting member 54 having an engagement groove defined therein for engagement with a clutch member 55.

It is to be noted that the paired mounts, one of which is identified by 51 and is shown as provided on the varifocal lens assembly, have respective sets of electric terminals which are, when the lens assembly is mounted on the camera body, connected together to establish associated electric circuits. In such case, one of the electric terminals provided on the mount of the camera body is an electric power supply terminal electrically connected with a source of electric power, for example, a battery, loaded in the camera body whereas one of the electric terminals provided on the mount of the varifocal lens assembly, which is connected with the electric power supply terminal when the lens assembly is mounted on the camera body is an electric power receiving terminal electrically connected with a zooming drive motor built in the lens assembly. Hence, assuming that the lens assembly is mounted on the camera body, a manipulation of the operating ring 1 can result in a supply of the electric power from the electric power source in the camera body to the zooming drive motor thereby to accomplish the powered zooming capability.

However, when the mount of the camera body has no electric power supply terminal referred to above, no powered zooming capability is available even though the varifocal lens assembly of the present invention is mounted on the camera body, and only a manual zooming capability is available. In order to accomplish the manual zooming operation, it is necessary to disconnect the zooming drive motor in the lens assembly from a manual zooming member, i.e., a zooming cam ring 4 so far shown. The clutch member 55 referred to above is provided for this purpose and is operatively coupled with a clutch mechanism as will be described later. In any event, an axial slide of the clutch member 55 can disconnect the zooming cam ring 4 from the zooming drive motor.

Referring to FIGS. 1 to 9, a zooming reduction system 32 for a powered zooming capability is drivingly coupled with the zooming drive motor through the clutch mechanism and is meshed with a geared portion 4c formed on a portion of an inner peripheral surface of the zooming cam ring 4 adjacent a rear end thereof. The zooming cam ring 4 is formed with an axially extending slot 4a and has pawls 4b formed on a front end thereof so as to protrude radially outwardly and, also, ribs 4d on a portion of the inner peripheral surface thereof adjacent the front end thereof so as to protrude radially inwardly. On the other hand, the fixed barrel 5 extending through the zooming cam ring 4 has a generally helically extending cam groove 5a and, also, a radially inwardly recessed annular groove 5b defined at a front end thereof. The fixed barrel 5 also has a third zooming gear support plate 36 secured thereto and forming a part of the zooming reduction system 32, and axial grooves 5c defined in an inner peripheral surface thereof. It is to be noted that one end of a focusing drive ring 12 is engaged to an inner portion of the fixed barrel 5. It is also to be noted that the ribs 4d in the zooming cam ring 4 are slidably engaged in the annular groove 5b at the front end of the fixed barrel 5 so that the zooming cam ring 4 can be rotated around the fixed barrel 5, but cannot move in a direction axially of the lens assembly.

A first movable lens mount 3 is mounted around the zooming cam ring 4 through axial ribs 3b formed on an inner peripheral surface thereof and supports the first lens group L1. This first movable lens mount 3 has an outer peripheral surface with helicoidal projections that are engageable in the helicoidal grooves 2a formed in the outer barrel 2 as hereinbefore described.

A zooming drive ring 6 is retained inside the fixed barrel 5 and has an engagement projection 6b protruding outwardly from a rear end thereof and ribs 6c protruding radially inwardly from an inner peripheral surface thereof. This zooming drive ring 6 also has helical cam grooves 6a defined therein and, also, guide pins 24 protruding radially outwardly therefrom. The guide pins 24 extend through the cam grooves 5a in the fixed barrel 5 and terminate in the axial slot 4a in the zooming cam ring 4.

An axially movable barrel 7 is inserted in the zooming drive ring 6 and is formed with an axial escapement slot 7b, cutouts 7c at a front end thereof, ribs 7d at a rear end thereof, at least one projection 7a protruding radially inwardly thereof, and a helicoidal groove 7e formed on a portion of the inner surface thereof adjacent the rear end thereof. Since the ribs 7d in the axially movable barrel 7 are engaged with the ribs 6c in the zooming drive ring 6, the axially movable barrel 7 is rotatable relative to the zooming drive ring 6, but is movable together with the zooming drive ring 6 in a direction axially of the lens assembly.

A focusing barrel 8 has its outer peripheral surface formed with a helicoidal groove 8a meshed with the helicoidal groove 7e in the axially movable barrel 7 and its inner peripheral surface formed with radially inwardly protruding ribs 8b. This focusing barrel 8 is also formed with a longitudinal member 8c extending outwardly from a rear end thereof towards the mount 51 and having a longitudinal groove 5d defined in the longitudinal member 8c.

A third movable lens mount 9 inserted inside the axially movable barrel 7 has defined therein axial slots 9a and 9b and also has an outer peripheral surface formed with axial grooves 9c and a circumferential groove 9e. Rigidly secured to a front end of the third movable lens mount 9 by means of set screws is axially movable keys 10 that extend radially outwardly through the cutouts 7c in the axially movable barrel 7, the keys 10 having respective elongated engagements 10a that are received in the associated axial grooves 5c in the fixed barrel 5. Each of the elongated engagements 10a of the keys 10 has a length sufficient to avoid any possible disengagement thereof from the associated axial groove 5c in the fixed barrel 5 even though the third lens mount 9 to which the respective key 10 is secured is extended, i.e., moved in a left-hand direction as viewed in FIGS. 1 to 4, as a result of any one of the zooming and focusing operations. This third movable lens mount 9 carries the third lens group L3 and is provided with a known aperture mechanism 56 positioned substantially intermediate of the length thereof, the aperture mechanism 56 being operable in response to a release of a shutter mechanism (not shown). The third movable lens mount 9 has a circumferentially extending groove 9d in which a generally C-shaped leaf spring 19 is retained.

Since the projections 7a extending radially inwardly from the inner peripheral surface of the axially movable barrel 7 are engaged in the axial grooves 9c in the third movable lens mount 9, the axially movable barrel 7 can be rotatable together with the third movable lens mount 9, but can be moved independently of the third movable lens mount 9 in the axial direction a distance defined by the length of each axial groove 9c in which the associated projection 7a is engaged. The focusing barrel 8 is rotatable relative to the third movable lens mount 9 and is axially movable together with the third movable lens mount 9 because of the ribs 8b in the focusing barrel 8 engaged slidably in the circumferential groove 9e in the third movable lens mount 9.

A second movable lens mount 11 is received within the third movable lens mount 9 and carries the second lens group L2. This second movable lens mount 11 has a plurality of guide pins 26 protruding radially outwardly therefrom so as to extend through the respective axial slots 9a in the third movable lens mount 9 and then through the escapement slots 7b in the axially movable barrel 7 and terminating in the cam grooves 6a in the zooming drive ring 6.

A drive ring 13 for driving the fourth lens group L4 is positioned on one side of the third movable lens mount 9 close towards the mount 51 and has a cam groove 13b and an insertion groove 13c defined in an inner peripheral surface thereof adjacent a rear end thereof. This drive ring 13 has a front end formed with a generally Y-shaped support piece 13a rigidly mounted thereon so as to extend radially outwardly therefrom, the Y-shaped support piece 13a receiving therein the engagement projection 6b integral with the zooming drive ring 6.

A fourth movable lens mount 17 positioned inside the third movable lens mount 9 and carrying the fourth lens group L4 has a rear end face formed with a plurality of jig engagement grooves spaced an equal distance from each other in a direction circumferentially thereof. This fourth movable lens mount 17 is also formed on its outer peripheral surface with a circumferential groove 17a in which generally semi-circular guides 18 of substantially identical design are engaged. It is to be noted that the semi-circular guides 18 are disposed in symmetrical fashion with each other with respect to the fourth movable lens mount 17 and that each of the semi-circular guides 18 is provided with a respective guide pin 28 threaded thereto so as to extend radially outwardly therefrom, the respective guide pin 28 extending through the associated axial slot 9b in the third movable lens frame 9, terminating in the cam groove 13b in the drive ring 13.

A fifth lens mount 20 carrying the fifth lens group L5 is inserted into the third movable lens mount 9 with a front end thereof held in abutment with the generally C-shaped leaf spring 19 retained inside the third movable lens mount 9. This fifth lens mount 20 has an inner peripheral surface formed with a plurality of cutouts spaced an equal distance from each other in the circumferential direction for the passage of jigs therethrough. A rear end of the fifth lens mount 20 has its outer peripheral surface tapered in a direction towards the mount 51 with a space defined between it and the inner peripheral surface of the third movable lens mount 9. Within this space between the tapered outer peripheral surface of the fifth lens mount 20 and the inner peripheral surface of the third movable lens mount 9, a generally C-shaped wire spring 21 is mounted to fix the fifth lens mount 20 in position inside the third movable lens mount 9.

At a rear portion of the engagement between the third movable lens mount 9 and the drive ring 13, and within the insertion groove 13c defined in an inner peripheral surface of the driving ring 13, a space adjustment ring 16 and a space adjustment washer 15 both for adjusting a spacing between the third and fourth lens groups L3 and L4 are inserted and, at the same time, a ring-shaped retainer 14 for the retention of a movement of the fourth lens group L4 is threaded to an externally threaded portion 9g formed at the rear end of the third movable lens mount 9 thereby to fix the both together.

Figure 2:
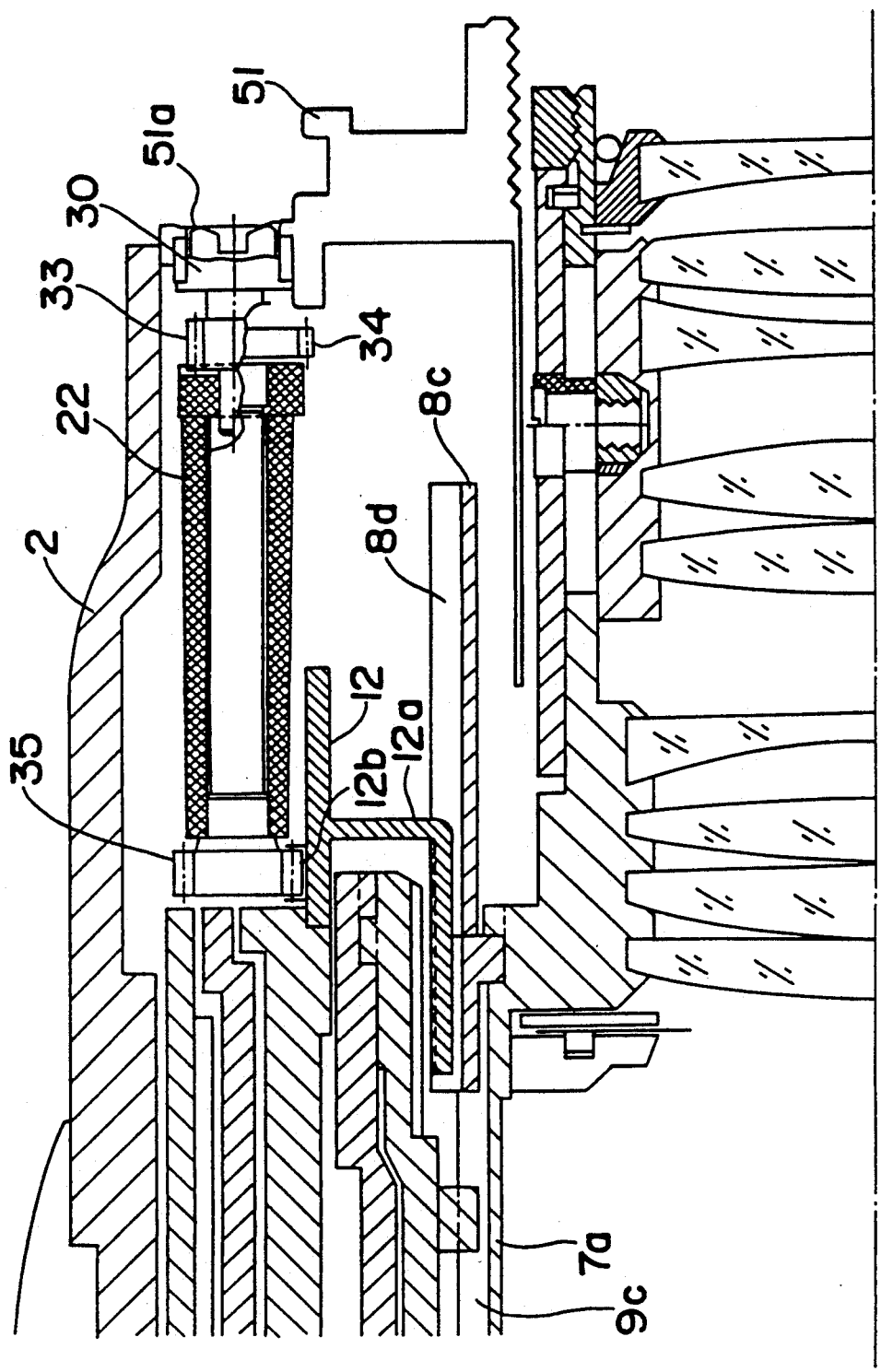
FIGS. 2 and 3 are fragmentary longitudinal sectional views, on an enlarged scale, of a portion of the varifocal lens assembly shown in FIG. 1 as viewed from different angles.
Figure 3:
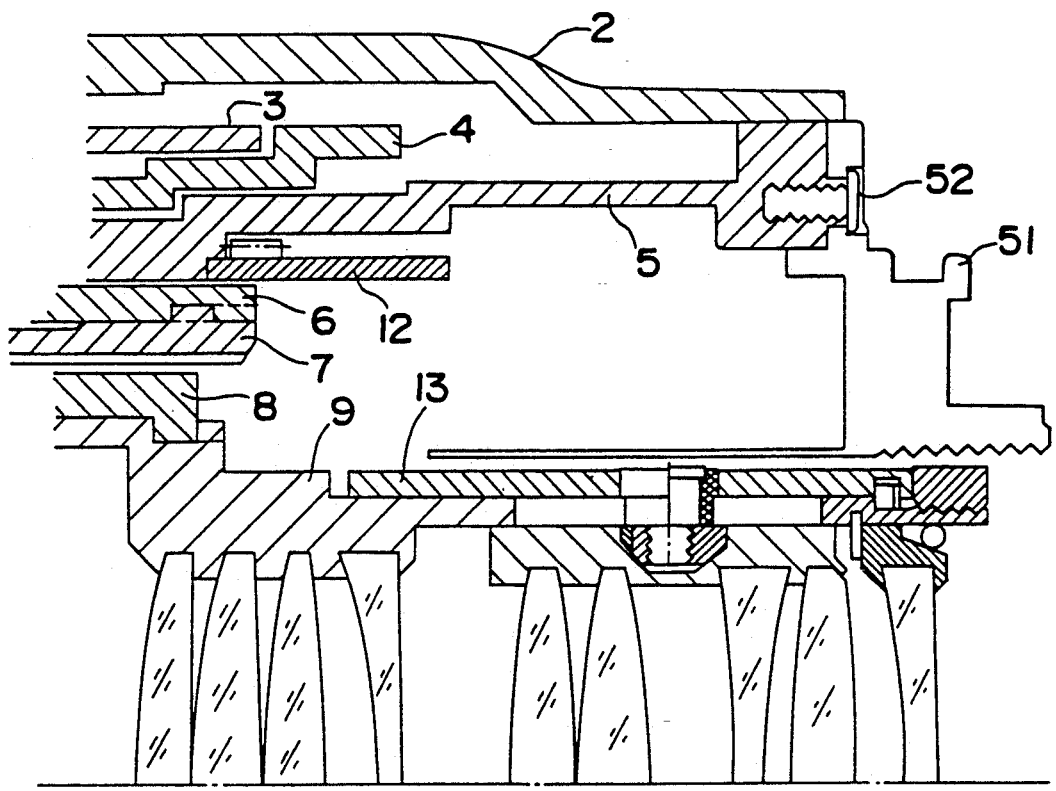

Referring particularly to FIG. 2, an auto-focusing (AF) coupler 30 is situated within and exposed to the outside from an engagement hole 51a defined in the mount 51 having the light shielding member 51b. When this AF coupler 30 is drivingly connected with a mating AF coupler (not shown) exposed to the outside through the mount on the camera body, a driving force of a drive motor not shown, but built in the camera body can be transmitted to the AF coupler 30. The driving force transmitted to the AF coupler 30 is in turn transmitted to the focusing drive ring 12 through a group of powered focusing reduction gears 33, 34 and 35 operatively mounted on a gear support plate 22.

As hereinbefore described, the focusing drive ring 12 is mounted to the rear end of the fixed barrel 5 and has an outer peripheral surface formed with a threaded portion 12b that is meshed with the powered focusing reduction gear 35. This focusing drive ring 12 is formed with an engagement arm 12a that extends radially inwardly and is then bent so as to extend into and between the zooming drive ring 6 and the axially movable barrel 7 for engagement in the longitudinal groove 8d defined in the focusing barrel 8. The engagement of the engagement arm 12a in the longitudinal groove 8d extends a distance sufficient to avoid any possible disengagement of the engagement arm 12a from the longitudinal groove 8d even though the focusing barrel 8 is moved in an axial direction parallel to the optical axis as a result of any one of the zooming and focusing operations.

Hereinafter, the drive motor, the reduction mechanism and control members such as IC, all built in the varifocal lens assembly of the present invention will be described with particular reference to FIGS. 5 and 7.

Figure 5:
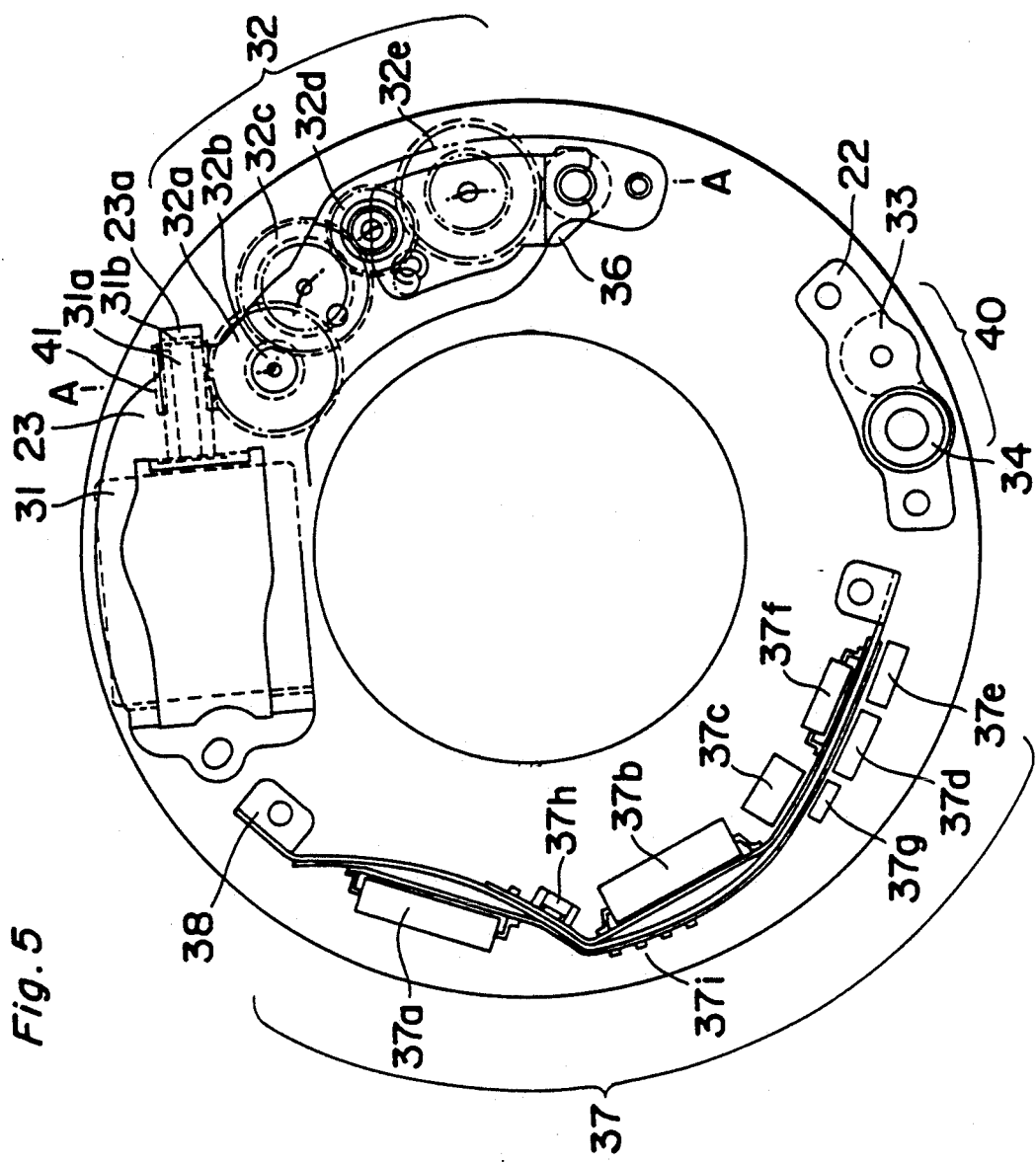
FIG. 5 is a transverse view showing an arrangement of various component parts used in the varifocal lens assembly of the present invention.
Figure 8:
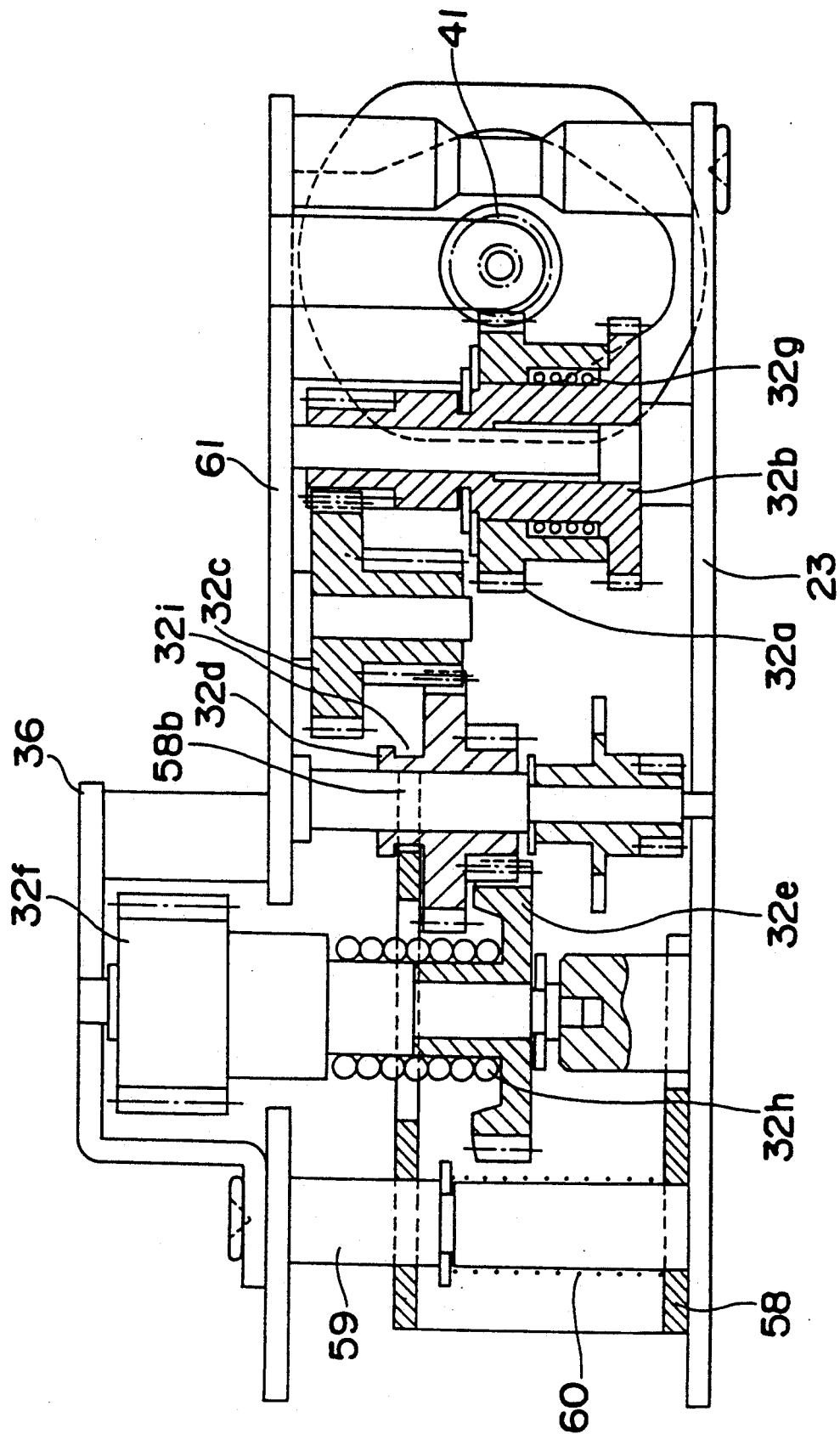
FIG. 8 is a cross-sectional view, on an enlarged scale, taken along the line A—A in FIG. 5 with the lens assembly set in a powered zooming mode.
Figure 9:
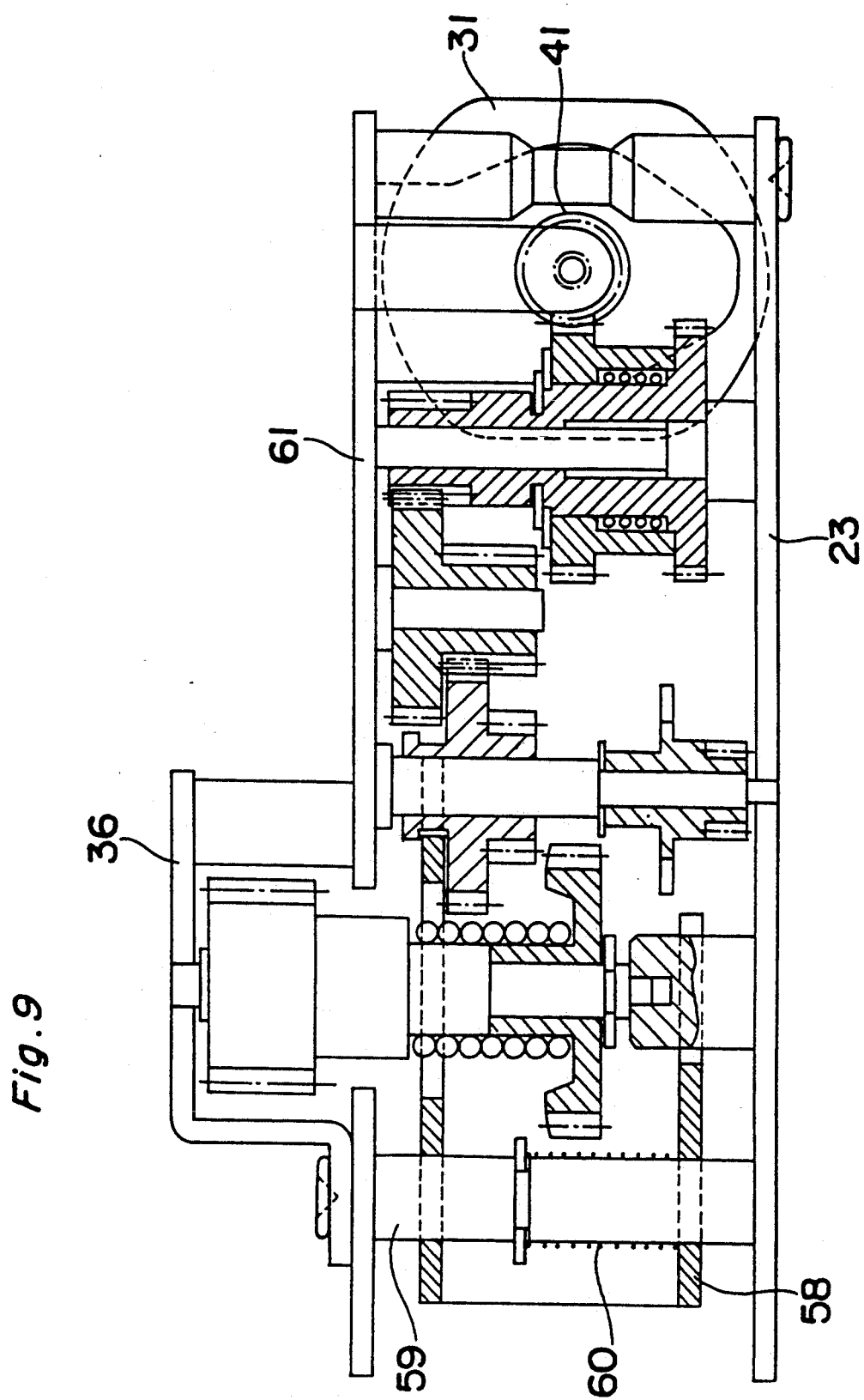
FIG. 9 is a cross-sectional view, on an enlarged scale, taken along the line A—A in FIG. 5 with the lens assembly set in a manual zooming mode.

FIG. 5 illustrates a rear end view of the varifocal lens assembly as viewed in a direction parallel to the optical axis thereof, showing how the gear support plate 23 carrying various reduction gears is mounted at rear of the varifocal lens assembly adjacent the mount 51. FIG. 7 illustrates a fragmentary rear end view, on an enlarged scale, showing the gear support plate 23 and its associated component parts. A cross-sectional representation taken along the line A—A in FIG. 5 which illustrates a meshed relationship between gears 32d and 32e during a powered zooming mode is shown in FIG. 8, while a condition in which the gears 32d and 32e are disengaged from each other by the clutch mechanism during a manual zooming mode is shown in FIG. 9.

The gear support plate 23 is secured to the rear end of the fixed barrel 5 and is of a generally arcuate shape which generally occupies a part of the circle concentrical with the optical axis of the varifocal lens assembly. The zooming drive motor, generally identified by 31 and having a drive shaft 31a, is fixedly mounted on the gear support plate 23 with the drive shaft 31a oriented perpendicular to the optical axis of the lens assembly and generally tangentially of the circle partly depicted by the shape of the gear support plate 23. A worm gear 41 is mounted on the drive shaft 31a of the drive motor 31 for rotation together therewith and has a free end thereof formed with a spherical piece 31b. A thrust bearing 23a protrudes outwardly from the gear support plate 23 in a direction towards the optical axis of the lens assembly, and the spherical piece 31b at the free end of the drive shaft 31a is supported by this thrust bearing 23a in a one-point support fashion. A driving force induced by the zooming drive motor 31 is transmitted through the worm gear 41 to a helical gear 32a forming a part of the zooming reduction system 32 accompanied by a reduction in speed and, at the same time, a driving direction is changed from the direction perpendicular to the optical axis of the lens assembly to a direction parallel to the optical axis of the lens assembly. In other words, various gears forming the zooming reduction system 32 including the helical gear 32a and arranged in a generally arcuate row following the shape of the gear support plate 23 are supported for rotation about respective axes parallel to the optical axis of the lens assembly.

Figure 7:
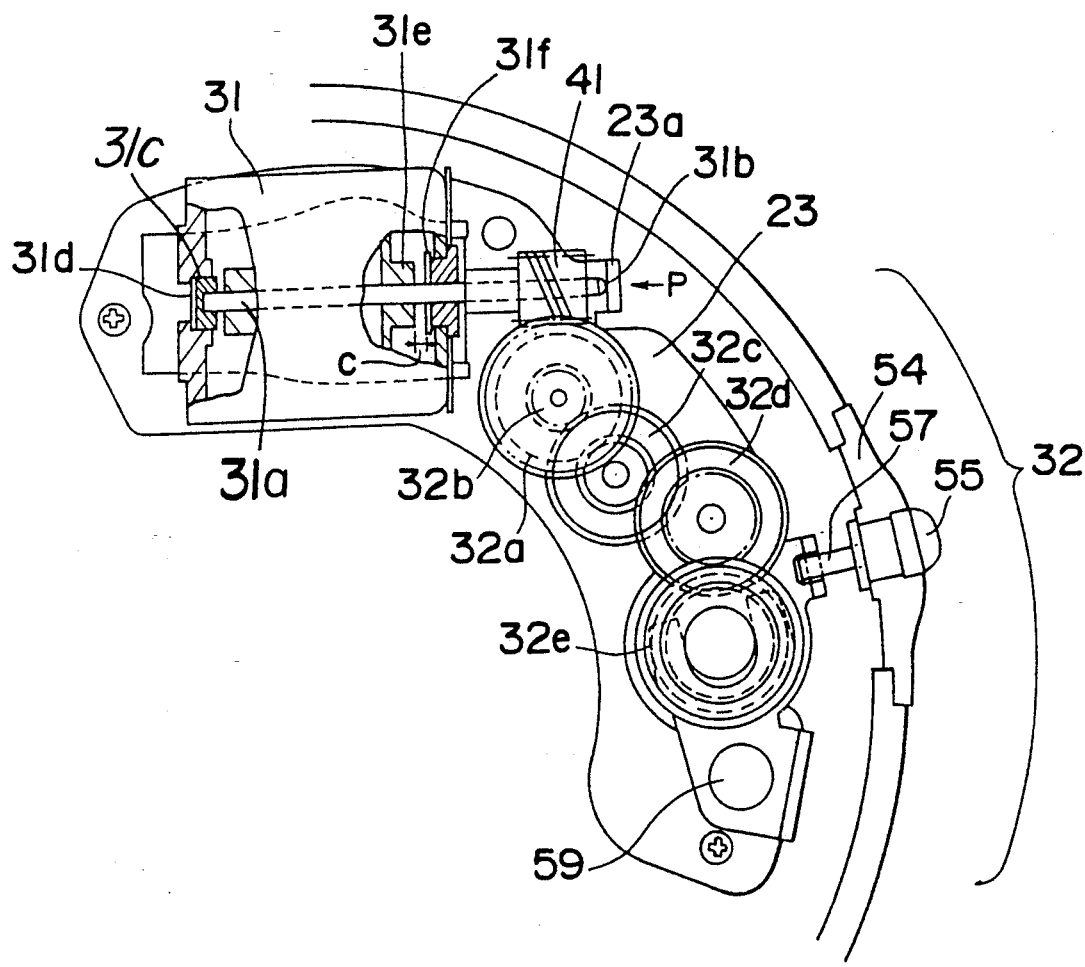
FIG. 7 is a fragmentary view, on an enlarged scale, of a portion of the varifocal lens assembly shown in FIG. 5.

The thrust bearing is employed to provide a clearance C between a radial bearing 31e and a collar 31f for avoiding a thrust load which would be generated at an interface between the radial bearing 31e and the collar 31f during a rotation of the zooming drive motor 31 in a first direction, for example, counterclockwise as viewed in a direction conforming to the arrow P in FIG. 7, although such a thrust load will not be generated during the rotation of the zooming drive motor 31 in a second direction counter to the first direction, i.e., clockwise as viewed in the direction conforming to the arrow P because a spherical piece 31c formed at another free end of the drive shaft 31a is supported by a thrust bearing 31d in a one-point support fashion. This arrangement brings about an additional advantage in that any possible shaking motion of the drive motor in a direction longitudinally thereof can be easily adjusted to minimize a back-lash of the lens assembly.

The driving force of the zooming drive motor 31 is further transmitted through gears 32b, 32c, 32d, 32e and 32f of the reduction system 32 to the geared portion 4c formed on a portion of the inner peripheral surface of the zooming cam ring 4 adjacent the rear end thereof. The gears 32b to 32f are interposed between the gear support plate 23 and a second gear support plate 61 spacedly connected with the gear support plate 23 by means of a plurality of poles, and only the gear 32f which transmits the driving force to the geared portion 4c has one end fixed to a third gear support plate 36 that is secured to the second gear support plate 61 as shown in FIG. 8.

More specifically, a bidirectional spring clutch 32g is interposed between the helical gear 32a and the gear 32b. This spring clutch 32g is rotatable together with the helical gear 32a and strongly tightens the gear 32b so that, when a load imposed on the drive motor exceeds a predetermined value, for example, when as a result of a zooming operation the lens assembly is set to the wide position or the tele position, the spring clutch 32g can rotate idle relative to the gear 32b to avoid any possible flow of an excessive electric current to the drive motor. The gear 32b is drivingly coupled with the gear 32e through the gears 32c and 32d. A spring clutch 32h serving as a unidirectional clutch is interposed between the gears 32e and 32f for avoiding any possible damage to the gears due to an external force. Specifically, while the spring clutch 32h strongly tightens both of the gears 32e and 32f so that it can rotate together with the gears 32e and 32f, the both can rotate idle only when an excessive external force acts on the first movable lens mount 3. The excessive external force may act on the first movable lens mount 3, for example, when while the first movable lens mount 3 is extended to set the lens assembly at a position of maximum available focal length, the photographer may inadvertently drop the camera onto the ground or forcibly push it.

Also, within the reduction mechanism, a switching clutch for switching between a powered zooming mode and a manual zooming mode is provided as will be described in detail later. Referring to FIGS. 7 and 8, the outer barrel 2 is provided with the clutch member 55 as hereinbefore described. This clutch member 55 has a connecting link 57 connected therewith for movement together therewith. This connecting link 57 extends in a direction generally parallel to the optical axis of the lens assembly and terminates in engagement with an engagement 58a defined at one end of a clutch lever 58. The gear 32d has one end formed with an annular groove 32i as shown therein for slidingly receiving a generally U-shaped end of the clutch lever 58 that is opposite to the end where the engagement 58a is formed. This clutch lever 58 and the gear 32d are movable together therewith in a direction parallel to the optical axis of the lens assembly along a pole 59 that connects the gear support plates 23 and 61 together while supporting the gear 32d thereon.

Figure 1:
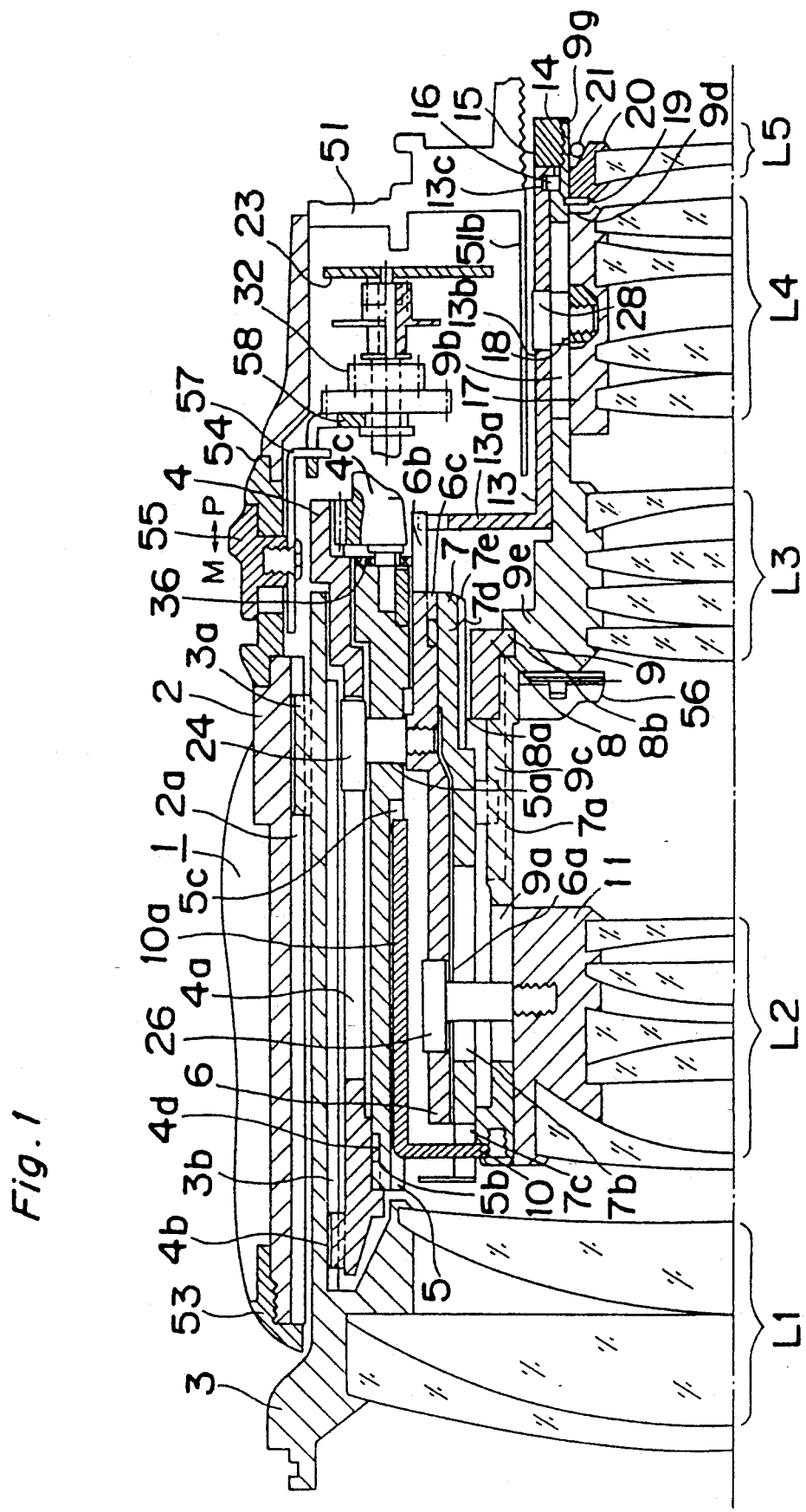
FIG. 1 is a longitudinal sectional view of one of axial halves of a varifocal lens assembly embodying the present invention.

In the construction described above, when the clutch member 55 is slid in a direction shown by M in FIG. 1, the clutch lever 58 is moved together with the connecting link 57 in a direction parallel to the optical axis of the lens assembly, disengaging the gear 32d from the gear 32e thereby to establish the manual zooming mode as shown in FIG. 9. During this condition, the manual zooming can be accomplished by manually moving the first movable lens mount 3 in a direction parallel to the optical axis of the lens assembly. On the other hand, when the clutch member 5 is returned in a direction shown by P in FIG. 1, the clutch lever 58 is moved by a biasing spring 60 to bring the gear 32d into mesh with the gear 32e. Even though at this time the gear 32d rides over the gear 32e, the rotation of the drive motor 31 permits the gears 32d and 32e to be meshed with each other, thereby to establish the powered zooming mode.

Referring to FIG. 5, a circuit mounting block 37 associated with the powered zooming scheme includes a flexible substrate 39 and a plurality of electronic component parts such as integrated circuit elements 37a, 37b, 37c and 37e mounted on respective sides of the flexible substrate 39 for use in performing various controls, a read-only memory 37f storing information associated with the varifocal lens assembly, transistors 37g and 37h and resistor 37i. The flexible substrate 38 is secured at one end to the outer barrel 5 by means of a flexible print retaining plate 38 and at the opposite end to a portion (not shown) of the lens assembly, a generally intermediate portion of the flexible substrate 39 extends generally perpendicular to the optical axis of the lens assembly and also following the circle.

A powered focusing reduction block 40 includes a focusing gear support plate 22 and powered focusing reduction gears 33, 34 and 35 rotatably mounted on the gear support plate 22 and operable to transmit a driving force to the focusing drive ring 12. This driving force is transmitted from the camera body to the interior of the lens assembly through the AF focusing coupler and then to the focusing barrel 8 through the powered focusing reduction block and also through the focusing drive ring 12.

As hereinabove described, the zooming gear support plate 23, the zooming drive motor 31, the flexible substrate 38 and the focusing gear support plate 22 are arranged generally in a circular row concentrical with the optical axis of the lens assembly and in a plane perpendicular to the optical axis of the lens assembly.

The varifocal lens assembly of the above described construction can be operated in the following manner. It is, however, to be noted that the illustrated varifocal lens assembly is of a AF type having the zooming drive motor within the lens body and having a powered focusing capability accomplished by switching the powered zooming operating ring 1.

Figure 10:
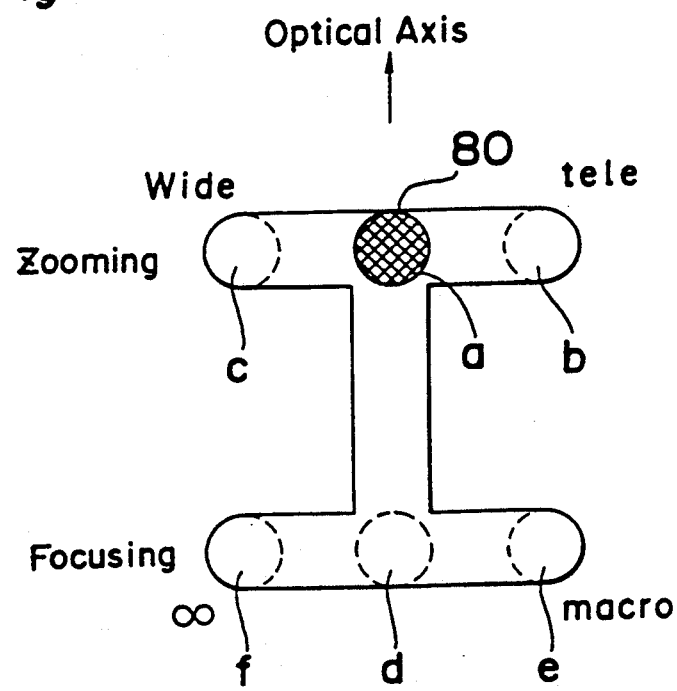
FIG. 10 is a schematic diagram showing a guide groove formed in one of lens barrels of the varifocal lens assembly of the present invention.

The manner in which the powered zooming operation and the powered focusing operation can be accomplished by the manipulation of the operating ring 1 will first be described. The outer barrel 2 has its outer peripheral surface formed with a generally H-shaped guide groove having six operative positions a, b, c, d, e and f as shown in FIG. 10, and, as the operating ring 1 is manipulated, a switch 80 secured to an inner surface of the operating ring 1 moves within this H-shaped guide groove. Depending on one of the positions a to f in the H-shaped guide groove, this switch 80 outputs to a lens control IC element an operational signal representative of the position actually occupied by the switch 80. This switch 80 is, however, normally biased to the home position a in the H-shaped guide groove and can, therefore, automatically return to the home position even through any manipulation such as the zooming is carried out. The powered zooming operation can be accomplished by rotating the operating ring 1 in a direction circumferentially of the lens assembly with the switch 80 departing from the home position a. Where the operating ring 1 is rotated circumferentially in a right-hand or left-hand direction as viewed in FIG. 10, i.e., a direction to bring the switch 80 towards the position b or the position c, the lens assembly can be set to the tele position or the wide position, respectively. These right-hand and left-hand directions conform to the circumferential direction of the lens assembly.

In practice, the switch 80 is provided with a brush contact and the H-shaped guide groove is provided with a patterned stationary contact, the brush contact and patterned stationary contact constitute a well-known encoder. Accordingly, when the switch 80 is moved an angular distance from the home position towards either one of the tele and wide positions, the switch 80 generates an output signal of a level variable in proportion to the angular distance over which the switch 80 is actually moved so that the zooming speed can be variable. In other words, when the switch 80 is moved a slight angular distance from the home position a towards either one of the positions b and c consequent upon rotation of the operating ring 1, the zooming speed may be low, but the zooming speed may increase as the switch 80 approaches either one of the positions b and c.

When the operating ring 1 is pulled in a direction axially of the lens assembly and away from the camera body (not shown), the switch 80 can be moved towards the position d. So long as the switch 80 is held at the position d, the switch 80 outputs a signal and no automatic focusing operation is available through the coupler. The powered focusing operation can be accomplished when, after the switch 80 has been moved to the position d, the operating ring 1 is rotated in a direction circumferentially of the lens assembly with the switch 80 departing from the position d towards either one of the positions e and f. When the operating ring 1 is rotated circumferentially in the right-hand direction with the switch 80 consequently moved towards the position e, the lens assembly can be focused on an object closest to the camera with the focusing lens groups set at the closest available, or macro, position, but when the operating ring 1 is rotated circumferentially in the left-hand direction with the switch 80 consequently moved towards the position f, the lens assembly can be focused on an object farthest from the camera with the focusing lens groups set at the infinity position. Even during the rotation of the operating ring 1 to being the switch 80 to either one of the positions e and f, the focusing speed is variable as is the case with that during the zooming operation.

Referring to the zooming operation, as the operating ring 1 is manually rotated circumferentially with the switch 80 departing from the home position towards any one of the tele and wide positions b and c, the zooming drive motor 31 is driven with its driving force transmitted to the zooming cam ring 4 through the zooming reduction system 32. The zooming cam ring 4 is only rotatable since the axial movement thereof in a direction parallel to the optical axis of the lens assembly is inhibited by the ribs 4d engaged in the annular groove 5b in the fixed barrel 5, the rotation of the zooming cam ring 4 results in a corresponding rotation of the first movable lens mount 3 due to the engagement of the pawls 4b with the axial ribs 3b. As the first movable lens mount 3 is rotated in the manner described above, the first lens group L1 carried by the first movable lens mount 3 extends, i.e., is moved leftwards as viewed in FIG. 1, because of the engagement between the helicoidal grooves 2a and the helicoidal grooves 3a.

On the other hand, the rotation of the zooming cam ring 4 also brings about an axial movement of the zooming drive ring 6 so as extend in the direction parallel to the optical axis of the lens assembly while being rotated about the optical axis. This is possible because the guide pins 24 rigid on the zooming drive ring 6 extend through the cam grooves 5a into the axial slots 4a in the zooming cam ring 4. Also, the rotation of the zooming drive ring 6 in turn results in a linear extension of the second movable lens mount 11 in a direction parallel to the optical axis of the lens assembly because the guide pins 26 rigid on the second movable lens mount 11 extend through the axial grooves 9c in the third movable lens mount 9 and then through the axial engagement slots 7b in the axially movable barrel 7 into the helical cam grooves 6a in the zooming drive ring 6. The distance over which the second movable lens mount 11 extends, that is, is moved leftwards as viewed in FIG. 1, corresponds to composite leads of the helical cam grooves 5a and 6a. Hence, the second lens group L2 carried by the second movable lens mount 11 can be driven leftwards as viewed in FIG. 1 along the optical axis of the lens assembly.

On the other hand, the axially movable barrel 7 is rotatable relative to the zooming drive ring 6, but is movable together therewith in the direction axially of the lens assembly, since the ribs 7d in the axially movable barrel 7 are engaged with the ribs 6c in the zooming drive ring 6. Also, since the projections 7a in the axially movable barrel 7 are engaged in the axial grooves 9c in the third movable lens mount 9 to which the axially movable keys 10 are fitted, the axially movable barrel 7 can be moved in the direction axially of the lens assembly, but is inhibited from rotating thereabout. The focusing barrel 8 is helicoidally movably coupled with the axially movable barrel 7 by means of the helicoidal groove 8 and the helicoidal groove 7e and is, therefore, rotatable relative to the third movable lens mount 9, but is movable together therewith in the direction axially of the lens assembly because of the engagement of the ribs 6b in the circumferential groove 9e.

As hereinabove described, when the zooming drive ring 6 is extended while being rotated, the zooming drive ring 6, the axially movable barrel 7, the focusing barrel 8 and the third movable lens mount 9 are all moved an equal distance in the direction parallel to the optical axis of the lens assembly and, consequently, the third movable lens mount 9 is moved axially guided by the lead of the cam grooves 5a defined in the fixed barrel 5. Therefore, the third lens group L3 and the fifth lens group L5 carried by the fifth movable lens mount 20 are extended axially and in the direction parallel to the optical axis of the lens assembly. No rotatory and axial movement of the zooming drive ring 6 will at this time bring about a rotation of the focusing barrel 8 by means of respective leads of the helicoidal grooves 7e and 8a due to the axially movable barrel 7.

The drive ring 13 for driving the fourth lens group L4 is rotatable together with the zooming drive ring 6, as the latter is rotated, because of the engagement between the engagement projection 6b and the Y-shaped support piece 13a, and, at the same time, rotatable independent of the third lens mount 9, but movable together with said third lens mount 9 in the direction parallel to the optical axis of the lens assembly. The semicircular guides 18 are driven in the direction parallel to the optical axis of the lens assembly through the guide pins 28 because the guide pins 28 extend through the associated axial slots 9b in the third movable lens mount 9 so as to terminate in the cam grooves 13b in the drive ring 13. The extension of the guides 18 results in an extension of the fourth lens group L4 together with the fourth movable lens mount 17 and, at this time, the amount of extension of the fourth movable lens mount 17 in the direction parallel to the optical axis of the lens assembly corresponds to the composite leads of the cam grooves 5a and 13b.

The focusing operation will now be described. When a switch (not shown) installed in the camera body is turned on to set the camera in the AF mode or the operating ring 1 is manually rotated to allow the switch 80, then held at the focus-locked position d, to move towards one of the macro and infinity positions as viewed in FIG. 10, the driving force of the drive motor built in the camera body is transmitted to the interior of the varifocal lens assembly through the coupler 30. Specifically, this driving force drives the focusing drive ring 12 through the powered focusing reduction gears 33, 34 and 35. The rotation of the focusing drive ring 12 is in turn transmitted to the focusing barrel 8 through the engagement between the engagement arm 12a integral with the focusing drive ring 12 and the longitudinal groove 8d in the focusing barrel 18. Since the longitudinal groove 8d and the engagement arm 12a are engageable with each other over a distance sufficient to avoid any possible disengagement therebetween even when the focusing barrel 8 is driven together with the third movable lens mount 9 in the direction parallel to the optical axis of the lens assembly during the zooming operation.

Because of the engagement between the helicoidal grooves 7e and 8a, the rotation of the focusing barrel 8 can result in an axial movement thereof in the direction parallel to the optical axis of the lens assembly. The third movable lens mount 9 is rotatable relative to the focusing barrel 8, but is axially movable together therewith because of the engagement between the elongated engagement 10a in the third movable lens mount 9 and the axial groove 5c in the fixed barrel 5. The extension of this third movable lens mount 9 results in an extension of the third and fifth lens groups L3 and L5. At this time, the fourth lens group L4 carried by the fourth movable lens mount 17 is extended together with the third movable lens mount 9 since the drive ring 13 does not rotate. At the same time, the second lens group L2 does not move due to the provision of the axial slots 9a.

Hereinafter, means used to rectify any possible offset among the lenses after the assembly of the varifocal lens assembly of the present invention will be described.

As is well understood by those skilled in the art, because of the unique optical design of the varifocal lens assembly, any possible offset of at least one or some of the lenses forming the lens groups or lens units of the varifocal lens assembly from the optical axis will considerably adversely affect the performance of the lens assembly as a whole. More particularly, since an adverse influence which any possible error in air space between the third and fourth lens groups and any possible offset of the fourth lens group, including aspherical lenses, from the optical axis may bring about on an image plane is relatively large, the varifocal lens assembly embodying the present invention is provided with an adjustment mechanism for adjusting respective positions of the lenses after the assembly.

The air space between the third and fourth lens groups L3 and L4 is adjusted by varying a relative position between the third movable lens mount 9 and the fourth movable lens mount 13 in a direction parallel to the optical axis as will now be described in detail.

After the completion of assembly of the varifocal lens assembly embodying the present invention, the performance of the individual lenses forming the varifocal lens assembly is measured, followed by a determination of a correction value by which the air space between the third and fourth lens groups L3 and L4 is adjusted to allow the varifocal lens assembly as a whole to exhibit an optimum performance. Subsequently, the ring-shaped retainer 14 associated with the fourth lens group is removed and the drive ring 13 is pulled towards a film plane that is generally occupied by a photographic film, followed by a replacement of the space adjustment washer 15 with a different washer of similar construction. By this replacement of the adjustment washer 15, the position of the drive ring 13 relative to the third movable lens mount 9 can be adjusted in a direction parallel to the optical axis. It is to be noted, for the purpose of the above described adjustment of the air space, a number of washers of similar construction, but having varying thicknesses have to be prepared so that, when in need, one of them can be employed for the adjustment. The selection of one of the space adjustment washers 15 depends on the correction value that is determined in the manner described above.

After the above described adjustment, the drive ring 13 is re-mounted to occupy the initial position at which it is brought into abutment with the replaced space adjustment washer 15, with the retainer 14 fastened to avoid any possible separation of the replaced adjustment washer 15 from the lens assembly. In this connection, the optical design has been made to avoid the space between the fourth and fifth lens groups L4 and 15, which may vary in association with the above described adjustment, from affecting the lens performance.

The offset adjustment of the fourth lens group relative to the optical axis can be accomplished by the use of a jig used to rotate the fourth lens group L4 in search for the particular position where the optical performance can be balanced. More specifically, after the adjustment of the air space between the third and fourth lens groups L3 and L4 carried out in the manner described above, the jig having two pawls is inserted from the rear end of the lens assembly so as to extend through the cutouts defined in the fifth lens mount 20 until the pawls of the jig are brought into engagement with associated grooves defined at the rear end of the fourth movable lens mount 17. With the pawls of the jig so engaged in the grooves at the rear end of the fourth movable lens mount 17, the jig should be turned to rotate the fifth lens mount 20 retained by the retainer spring 21, however, optical design has been made that the rotation of the fifth lens mount 20 would not affect the optical performance of the fifth lens group L5. After the optimum position has been determined by the turn of the jig, the jig is then removed out from the rear end of the lens assembly.

When the varifocal lens assembly is assembled according to the teachings of the present invention, the number of necessary component parts may increase. This increase in number of the necessary component parts may eventually result in a rattling motion occurring between the fourth movable lens mount 17 and the semicircular guides 18. This type of rattling motion may also occur if some of the component parts are machined poorly. In either case, the rattling motion if quantitatively considerably may adversely affect the lens assembly to such an extent that any adjustment in position of the lens mount will be of no help. In view of this, the varifocal lens assembly embodying the present invention is provided with a mechanism effective to eliminate the above discussed rattling motion, which will now be described with particular reference to FIGS. 1 and 6.

The rattling between the fourth movable lens mount 17 and the semicircular guides 18 in a direction radially towards the optical axis can be minimized or eliminated by a generally ring-shaped, wavy biasing spring 62 that is undulated in a direction perpendicular to the optical axis. This biasing spring 62 is interposed at a position adjacent the front of the optical axis and between the fourth movable lens mount 17 and the semicircular guides 18 during the course of assembly of the lens assembly embodying the present invention.

Figure 6:
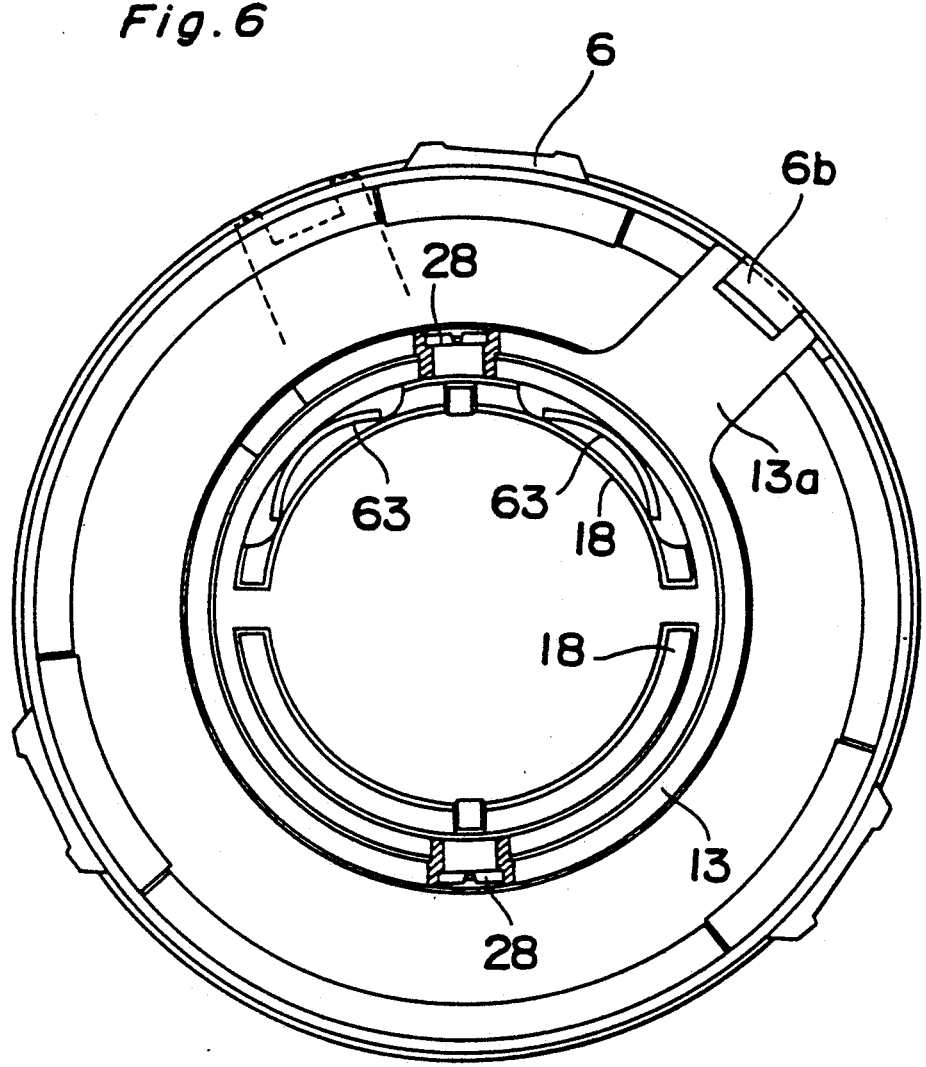
FIG. 6 is a transverse sectional view of the varifocal lens assembly.

Also, the rattling between the fourth movable lens mount 17 and the semicircular guides 18 in the radial direction can be minimized or eliminated by two generally U-shaped wavy biasing springs 63 that are undulated in a direction perpendicular to the optical axis. These two biasing springs 63 are interposed between the semicircular guides 18 and the third movable lens mount 9 with respective curved areas thereof oriented radially outwardly and are spaced right angles relative to each other with respect to the optical axis as best shown in FIG. 6.

In the foregoing embodiment of the present invention, the gist of the present invention lies in the cam grooves 5a defined in the fixed barrel 5. The merits of the provision of the cam grooves 5a will now be discussed with reference to FIGS. 11 and 12 as compared with any other cam grooves that do not have such features as possessed by the cam grooves 5a.

Figure 12:
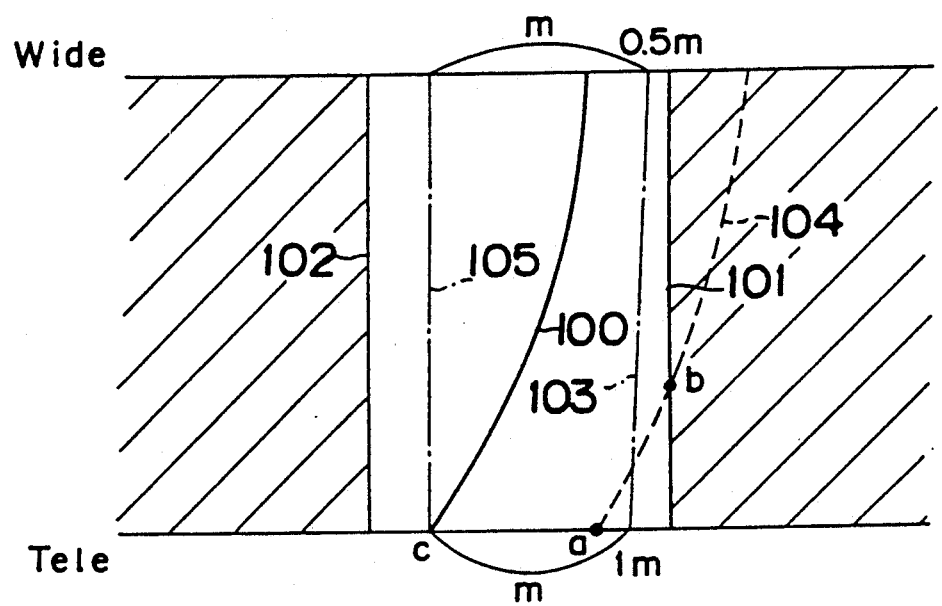
FIG. 12 is a schematic diagram showing how lens groups are moved in the varifocal lens assembly of the present invention.
Figure 11:
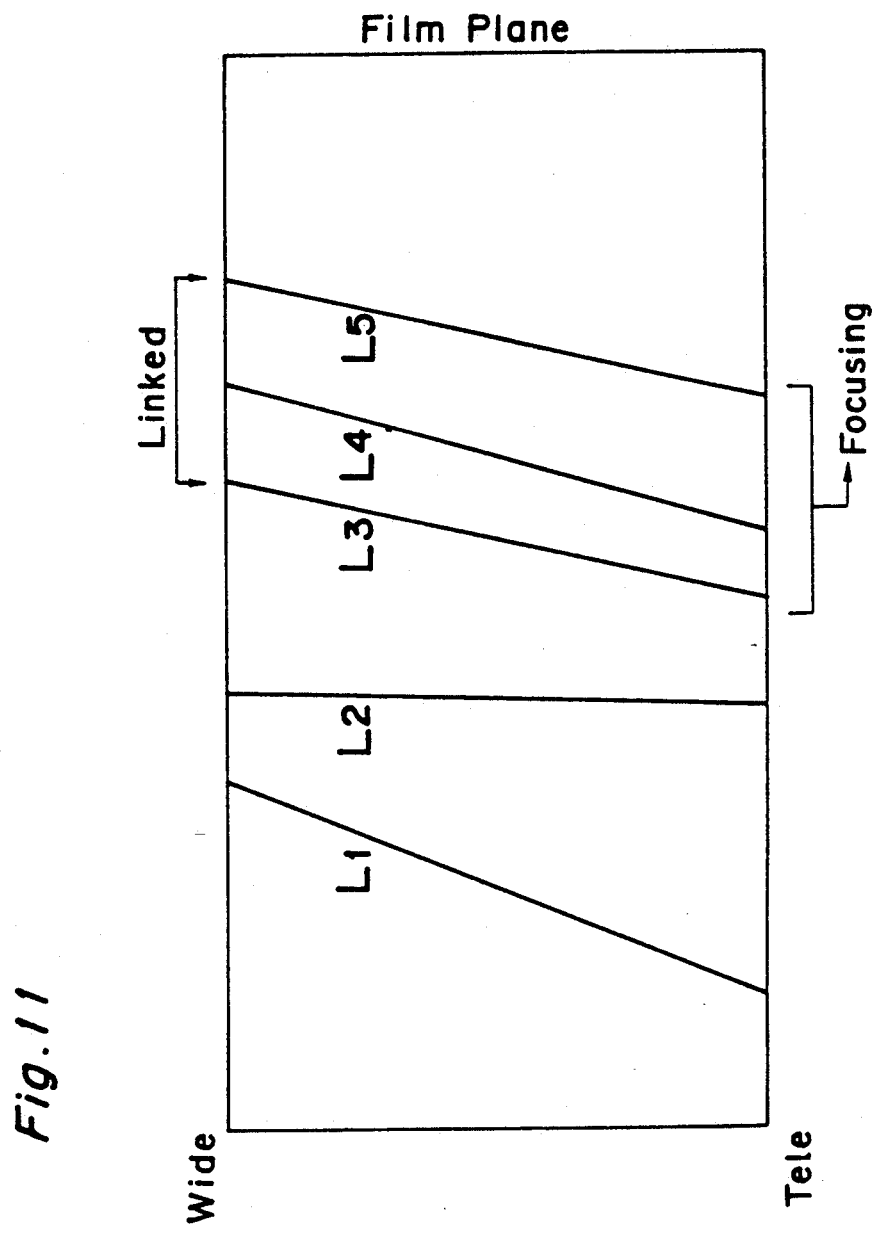
FIG. 11 is a schematic diagram showing how lenses are moved during the zooming operation.

FIG. 11 schematically illustrates how the lens groups L1 to L5 are driven during the zooming operation. As hereinbefore described, during the focusing operation, all of the lens groups L1 to L5 are simultaneously driven. FIG. 12 schematically illustrates only one of the focusing lens groups that is taken out for the purpose of discussion of the cam grooves 5a.

Referring to FIG. 12, there is shown the focal length f and the amount of extension of the focusing lens group that corresponds to the camera-to-object distance d. A change in focal length f and the amount of extension of the focusing lens groups are shown on the axis of ordinates and the axis of abscissa, respectively. Reference numeral 100 represents a curve representative of the position of the focusing lens group focused on the object at infinity distance, which position is plotted according to the change in focal length. In any standard zooming lens assembly, the cam groove determinative of the movement of the focusing lens group is so defined and so shaped as to represent such a curve 100 as shown therein.

Reference numeral 101 represents a far-side limit at which the focusing lens group, when extended, will not abut against a stationary member and over which no focusing lens group can move into a hatched area. According to the embodiment of the present invention, this far-side limit 101 is defined by a position at which a contact takes place between the fixed barrel 5 and the first movable lens mount 3. On the other hand, reference numeral 102 represents a close-side limit at which the focusing lens group, when moved in a direction counter to the direction of extension thereof, will not abut against any other lens group and is, in the illustrated embodiment, defined by a position at which a contact takes place between the Y-shaped support piece 13a and the ribs 6c in the zooming drive ring 6.

Reference numeral 103 represents a curve representative of the position of the focusing lens group focused on the object at a closest available distance, which position is plotted according to the change in focal length. In the varifocal lens assembly so far shown, the closest available distance reads 0.5 m and 1.0 m when the focal length thereof is adjusted to the wide position of smallest available focal length and the tele position of largest available focal length, respectively.

As discussed in connection with the prior art, the focusing lens group can be controlled by means of an electric control means to avoid any possible displacement in position of focus which would otherwise result from the zooming manipulation and, also, to avoid any possible collision of the focusing lens group with any other lens group and/or the stationary component part. However, this electric control scheme is no longer available in the event that the zooming manipulation is unnecessarily performed while the lens assembly is disconnected from the camera body.

In other words, where the cam groove that works during the zooming operation is so designed and so shaped as to follow the curve 100 shown in FIG. 12, and in the event that the zooming operation is effected while the lens assembly set at the tele position has been focused on the object as indicated by a point a, the focusing lens group may be guided along a curve 104, but shifted axially. Once this occurs, the focusing lens group may collide with the stationary member at a point b.

However, according to the present invention, each of the cam grooves 5a in the fixed barrel 5 is so shaped and so defined as to permit the focusing lens group to be guided along the curve 103 and, accordingly, even when the focusing lens group is extended to the point a and also to a maximum amount m, it will not override the far-side limit 101. Conversely, even if the zooming is effected starting from the point c at which the focusing lens group has not yet been extended, the focusing lens group is guided along a path shown by 105 that is shifted axially parallel to the path 103. However, since the path 105 does not go beyond the close-side limit 102, there is no possibility that the focusing lens group may collide with any other lens groups. The focusing lens group will be immediately moved to a proper in-focus position once the AF operation is effected, even where the focusing lens group is guided along the path 105, but not focused on any object.

Thus, since the cam grooves 5a are so shaped and so defined as hereinbefore discussed, the lead of the zooming cam associated with the focusing lens group may suffice to be small. This may lower a contribution to the zooming operation, but the optical design has been made to avoid any possible reduction in performance of the lens assembly as a whole.

As hereinbefore fully described, the provision of at least one cam designed to avoid any excessive movement of the focusing lens group over the infinity position makes it possible to manufacture the varifocal lens assembly simple in structure and effective to eliminate the problems hitherto encountered in the prior art varifocal lens assemblies with no need to use any extra separate component parts.

Although the present invention has fully been described in connection with the preferred embodiment thereof with reference to the accompanying drawings, it is to be noted that various changes and modifications are apparent to those skilled in the art without departing from the scope of the present invention as defined by the appended claims. Such changes and modifications are to be understood as included with in the scope of the present invention unless they depart therefrom.

What is claimed is:

1. A lens assembly having zooming and focusing capabilities including a plurality of lens units which comprise a focusing lens group and a zooming lens group, said lens assembly being of a type wherein a moving region ranging from an infinity position to a closest available position for said focusing lens group is variable with a change in focal length resulting from a zooming operation, said lens assembly comprising:
   a zooming mechanism for driving said zooming lens group to respective predetermined positions appropriate to a predetermined focal length;
   a focusing mechanism for driving said focusing lens group independently of the zooming mechanism, said focusing mechanism having a constant stroke regardless of the position of focal length selected by the zooming mechanism; and
   an interference preventing means provided in the zooming mechanism for avoiding any possible interference of any one of said lens units of said focusing lens group with the remaining lens units and/or any other stationary member when said focusing lens group is driven over said region.

2. The lens assembly as claimed in claim 1, wherein said zooming mechanism includes a barrel and wherein said interference preventing means comprises a cam means defined in said barrel.

3. The lens assembly as claimed in claim 1, wherein said lens assembly is a varifocal lens assembly.

4. The lens assembly as claimed in claim 1, further comprising a focusing means for focusing said focusing lens group, and a first control means for controlling the focusing mechanism according to an operation of the focusing means.

5. The lens assembly as claimed in claim 4, further comprising a zooming means for driving said zooming lens group, and a second control means for controlling the zooming mechanism according to an operation of the zooming means.

6. The lens assembly as claimed in claim 5, wherein said zooming mechanism includes a drive motor for driving said zooming lens group.

7. The lens assembly as claimed in claim 1, further comprising a zooming means for driving said zooming lens group, and a second control means for controlling the zooming mechanism according to an operation of the zooming means.

8. The lens assembly as claimed in claim 7, wherein said zooming mechanism includes a drive motor for driving said zooming lens group.

9. The lens assembly as claimed in claim 1, further comprising a drive transmission means driven by a focus adjustment means provided in a camera body for transmitting a driving force to said focusing mechanism.

10. The lens assembly as claimed in claim 1, wherein said focusing lens group comprises some of the lens units positioned furthest from an object to be focused.

11. A lens assembly having zooming and focusing capabilities including a plurality of lens units which comprise a focusing lens group and a zooming lens group, said lens assembly being of a type wherein a moving region ranging from an infinity position to a closest available position for a focusing lens group is variable with a change in focal length resulting from a zooming operation, said lens assembly comprising:
   a zooming mechanism for driving said zooming lens group to respective predetermined positions appropriate to a predetermined focal length;
   a focusing mechanism for driving said focusing lens group independently of the zooming mechanism, said focusing mechanism having a constant stroke regardless of the position of focal length selected by the zooming mechanism; and
   a lens driving means provided in the zooming mechanism for driving said focusing lens group to a position exceeding the infinity position regardless of the focal length selected by the zooming mechanism.

12. The lens assembly as claimed in claim 11, wherein said zooming mechanism includes a barrel and wherein said driving means comprises a cam means defined in said barrel.

13. The lens assembly as claimed in claim 11, wherein said lens assembly is a varifocal lens assembly.

14. The lens assembly as claimed in claim 11, further comprising a focusing means for focusing said focusing lens group, and a first control means for controlling the focusing mechanism according to an operation of the focusing means.

15. The lens assembly as claimed in claim 14, further comprising a zooming means for driving said zooming lens group, and a second control means for controlling the zooming mechanism according to an operation of the zooming means.

16. The lens assembly as claimed in claim 15, wherein said zooming mechanism includes a drive motor for driving said zooming lens group.

17. The lens assembly as claimed in claim 11, further comprising a zooming means for driving said zooming lens group, and a second control means for controlling the zooming mechanism according to an operation of the zooming means.

18. The lens assembly as claimed in claim 17, wherein said zooming mechanism includes a drive motor for driving said zooming lens group.

19. The lens assembly as claimed in claim 11, further comprising a drive transmission means adapted to be driven by a focus adjustment means provided in a camera body for transmitting a driving force to said focusing mechanism.

20. The lens assembly as claimed in claim 11, wherein said focusing lens group comprises some of the lens units positioned furthest from an object to be focused.

21. In a zoom lens assembly including a plurality of lens units, the individual lens units being collectively moved together to form a focusing lens group and a zooming lens group, respectively, the improvement comprising:

a zooming mechanism for driving predetermined lens units as a zooming lens group to predetermined positions appropriate to a selected predetermined focal length;

a focusing mechanism for driving predetermined lens units as a focusing lens group independently of the zooming mechanism, the relative movement of the focusing mechanism being constant regardless of the position of focal length selected by the zooming mechanism; and an interference preventing means, provided in the zooming mechanism, for avoiding any interference between any one of the lens units used for focusing with any of the other lens units when the focusing lens group is driven.

* * * * *